Figure 1:
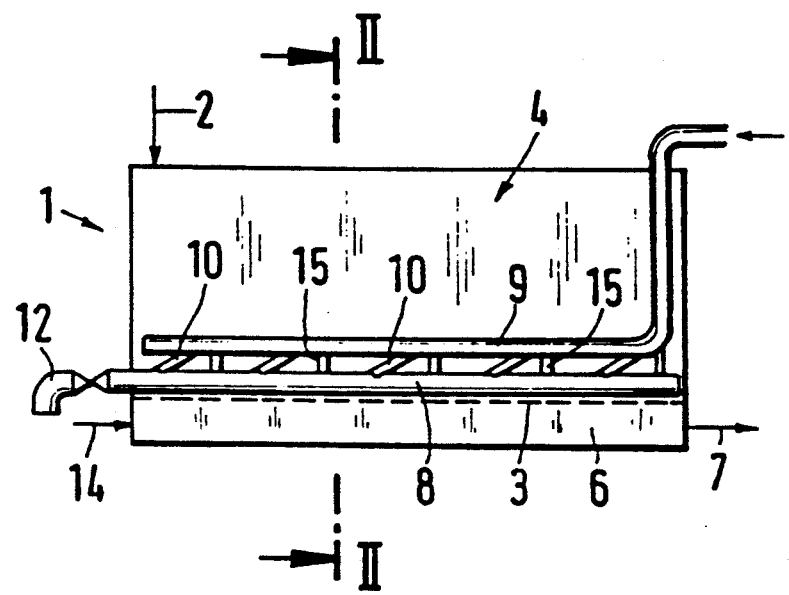

United States Patent [19]

Bertram et al.

[11] Patent Number: 5,209,846
[45] Date of Patent: May 11, 1993

[54] FILTER VESSEL PROVIDED WITH A RINSING TROUGH

[75] Inventors: Steffen Bertram, Frankfurt am Main; Karlheinz Schmitt, Kriftel, both of Fed. Rep. of Germany

[73] Assignee: Metallgesellschaft Aktiengesellschaft, Frankfurt, Fed. Rep. of Germany

[21] Appl. No.: 786,432

[22] Filed: Nov. 1, 1991

[30] Foreign Application Priority Data

Nov. 15, 1990 [DE] Fed. Rep. of Germany ....... 4036357

[51] Int. Cl.$^5$ .............................................. B01D 41/02
[52] U.S. Cl. ................................. 210/269; 134/166 R
[58] Field of Search .................... 134/166 R, 167 C; 210/189, 268-270

[56] References Cited

U.S. PATENT DOCUMENTS

| | | | |
|---|---|---|---|
| 3,444,078 | 5/1969 | Erskine | 210/290 |
| 3,741,235 | 6/1973 | Ambrose et al. | 134/166 R |
| 4,349,039 | 9/1982 | Egger | 134/167 C |

Primary Examiner—Ivars Cintins

[57] ABSTRACT

A filter vessel comprises a sieve or nozzle bottom, which carries a filter material and on which at least one trough for washing out the filter material is provided. A pipe for rinsing liquid is disposed above the trough and is provided with a plurality of nozzles, which are obliquely directed into the trough. The distance A measured between the top edges of the trough and the longitudinal axis of the pipe is 0.2 to 2 times the outside diameter D of the pipe.

3 Claims, 1 Drawing Sheet

FILTER VESSEL PROVIDED WITH A RINSING TROUGH

This invention relates to a vessel, which serves to contain granular filter material and comprises a sieve or nozzle bottom for carrying the filter material and at least one trough, which is provided on the bottom and serves to wash out the filter material by means of a rinsing liquid fed through nozzles into the trough.

Filter vessels provided with rinsing troughs are known and have been described, e.g., in Published German Application 19 47 229 and in U.S. Pat. No. 3,444,078. In the vessel disclosed in Published German Application 19 47 229, a rinsing pipe is provided on the bottom of the trough and is formed with holes and distributes rinsing liquid into the trough, but it has been found that in that arrangement a part of the filter material will be caught by and retained in the trough so that it is not possible or hardly possible to effect a clean washing-out.

It is an object of the invention to ensure in an apparatus as described hereinabove that the granular filter material will be washed out in a simple manner and without difficulty. This is accomplished in accordance with the invention in that a pipe for rinsing liquid is provided above the trough and has a plurality of nozzles, which are obliquely directed into the trough, and the angle between the longitudinal axis of the pipe and the spraying direction of a nozzle is 10° to 50° and the distance A measured between the top edges of the trough and the longitudinal axis of the pipe is 0.2 to 2 times the outside diameter D of the pipe. Owing to the provision of the pipe having oblique nozzles above the trough, a strong thrust is exerted on the filter material which is to be washed out. At the same time, the flow of the filter material from the region above the nozzle bottom to the trough is not be obstructed.

The trough suitably has a curved shape in cross-section so that there are no corners in which filter material could easily be retained.

Figure 2:
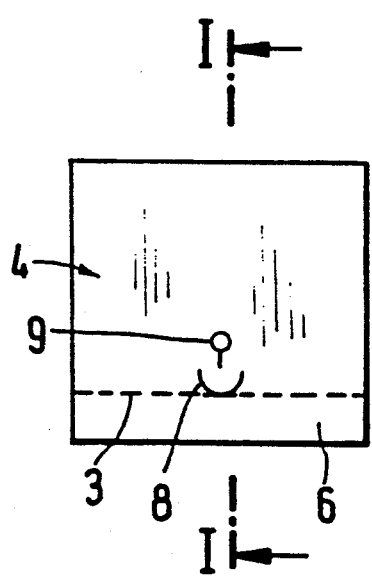
Figure 3:
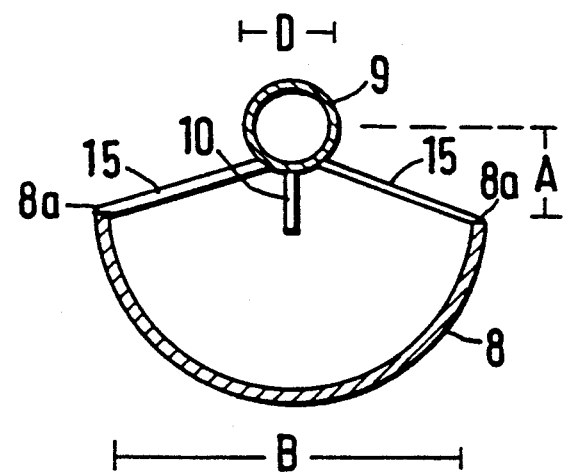

Further optional features of the invention are explained with reference to the drawing, in which FIG. 1 is a longitudinal sectional view taken along line I—I in FIG. 2 and showing the filter vessel, FIG. 2 is a transverse sectional view taken along line II—II in FIG. 1 and showing the filter vessel, and FIG. 3 is an enlarged transverse sectional view showing the rinsing pipe and the trough.

The filter vessel 1 shown in FIGS. 1 and 2 is provided in its upper portion with an inlet 2 for the liquid to be treated, such as water. A bed 4, which is not shown in detail and consists of granular filter material, such as activated carbon, sand or pumice, is provided over the nozzle bottom 3. The treated liquid is drained through a line 7 from the collecting chamber 6 disposed below the nozzle bottom 3.

To permit washing of the filter material out of the vessel 1, an open-topped trough 8 is provided on the nozzle bottom 3. A rinsing pipe 9 extends over the trough 8 and is supplied from the outside with a rinsing liquid, such as water. That liquid is subsequently discharged through nozzles 10 into the trough 8. The nozzles are forwardly inclined toward the outlet 12 of the trough 8, which outlet is adapted to be closed. The angle between the longitudinal axis of the pipe 9 and the spraying direction of a nozzle 10 is 10° to 50° and preferably not in excess of 40°. In dependence on the width of the vessel 1, one or more troughs 8 provided with an associated rinsing pipe 9 each are disposed over the nozzle bottom 3.

To move the filter material completely from the nozzle bottom 3 into the trough 8, the collecting chamber 6 is provided with a line 14 for supplying rinsing water and/or air. That fluid or fluid mixture enters the filter bed from below through the nozzle bottom 3 and raises the filter material so that it can flow into the trough 8.

The rinsing pipe 9 is held by supports 15 in such an arrangement over the trough 8 that the flow of the filter material to the trough 8 will not be obstructed. Further details are apparent from FIG. 3. For instance, the distance A measured between the top edges 8a of the trough and the longitudinal axis of the pipe 9 is 0.2 to 2 times and preferably at least 0.5 times the outside diameter D of the pipe. The distance B between the two top edges 8a of the trough is suitably 2 to 8 times the outside diameter D of the pipe and preferably 3 to 7 times that outside diameter D. The spacing of the nozzles 10 provided on the pipe usually amounts to 10 to 70 cm and preferably 20 to 50 cm. Optimum conditions for washing out are established when the trough has a curved rather than a cornered shape in cross-section. The cross-sectional shape shown in FIG. 3 is a semicircle.

It will be appreciated that the instant specification and claims are set forth by way of illustration and not limitation, and that various modifications and changes may be made without departing from the spirit and scope of the present invention.

What is claimed is:

1. In a filter vessel, which serves to contain granular filter material, and comprises a sieve or nozzle bottom for carrying the filter material, at least one open-topped trough being positioned on said bottom, said trough having two top edges and an outlet adapted to be closed, a pipe for feeding a rinsing liquid into the trough to wash out the filter material, said pipe being connected to means for feeding the rinsing liquid into the pipe, the pipe extending over the trough, the pipe being fastened to the edges of the trough by supporting means, the pipe being provided with nozzles, said nozzles having a spraying direction directed into the trough, said nozzles being forwardly inclined toward the outlet of the trough, said pipe having a longitudinal axis extending above said top edges, the angle between said axis and said spraying direction being 10° to 50°, the vertical distance A measured between the top edges and said axis being 0.2 to 2 times the outside diameter D of the pipe, and the distance B between the two top edges of the trough being 2 to 8 times the outside diameter D of the pipe.

2. A vessel according to claim 1, wherein the trough is curved in cross-section.

3. A vessel according to claim 1, wherein the nozzles provided on the pipe have a spacing of 10 to 70 cm.

* * * * *